(12) United States Patent
Lopez De Arroyabe

(10) Patent No.: US 10,196,019 B2
(45) Date of Patent: Feb. 5, 2019

(54) DEVICE FOR SUPPLYING A VOLTAGE TO AN ELECTRIC VEHICLE COMPRISING A PERMANENT MAIN BATTERY AND A REPLACEABLE AUXILIARY BATTERY

(71) Applicant: Bayerische Motoren Werke Aktiengesellschaft, Munich (DE)

(72) Inventor: Jose Lopez De Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 364 days.

(21) Appl. No.: 15/086,157

(22) Filed: Mar. 31, 2016

(65) Prior Publication Data

US 2016/0214552 A1 Jul. 28, 2016

Related U.S. Application Data

(63) Continuation of application No. PCT/EP2014/069048, filed on Sep. 8, 2014.

(30) Foreign Application Priority Data

Oct. 1, 2013 (DE) .................. 10 2013 219 967

(51) Int. Cl.
 *H01M 10/44* (2006.01)
 *H01M 10/46* (2006.01)
 (Continued)

(52) U.S. Cl.
 CPC ...... *B60R 16/0231* (2013.01); *B60L 11/1816* (2013.01); *B60L 11/1822* (2013.01);
 (Continued)

(58) Field of Classification Search
 CPC ................ H02J 7/0021; H02J 7/0026; H02J 2007/0059; H02J 7/04
 (Continued)

(56) References Cited

U.S. PATENT DOCUMENTS

2010/0315043 A1 12/2010 Chau
2011/0264287 A1 10/2011 Yasuda et al.
(Continued)

FOREIGN PATENT DOCUMENTS

CN 102237684 A 11/2011
CN 102834280 A 12/2012
(Continued)

OTHER PUBLICATIONS

Machine translation of JP 07-123514 (May 12, 1995).*
(Continued)

*Primary Examiner* — Edward Tso
(74) *Attorney, Agent, or Firm* — Crowell & Moring LLP

(57) ABSTRACT

An apparatus is provided for providing a supply voltage for operating an electrical device in a vehicle having a battery for producing the supply voltage. The battery is connected to a supply-voltage terminal for providing the supply voltage. A contacting apparatus contacts a replaceable battery for providing a charging voltage for charging the battery. In dependence on a state of charge of the battery, the replaceable battery can be electrically coupled to the main battery or disconnected from the main battery by way of the coupling apparatus.

12 Claims, 5 Drawing Sheets

(51) Int. Cl.
*B60R 16/023* (2006.01)
*B60L 11/18* (2006.01)
*B60L 15/00* (2006.01)
*B60L 15/04* (2006.01)

(52) U.S. Cl.
CPC ....... *B60L 11/1851* (2013.01); *B60L 11/1868* (2013.01); *B60L 15/007* (2013.01); *B60L 15/04* (2013.01); *Y02T 10/645* (2013.01); *Y02T 10/7005* (2013.01); *Y02T 10/7066* (2013.01); *Y02T 10/7072* (2013.01); *Y02T 90/124* (2013.01); *Y02T 90/14* (2013.01)

(58) Field of Classification Search
USPC .................. 320/103, 104, 128, 132, 149
See application file for complete search history.

(56) References Cited

U.S. PATENT DOCUMENTS

| | | |
|---|---|---|
| 2013/0020863 A1 | 1/2013 | Sugiyama et al. |
| 2014/0292235 A1 | 10/2014 | Murase et al. |

FOREIGN PATENT DOCUMENTS

| | | |
|---|---|---|
| DE | 10 2009 014 386 A1 | 9/2010 |
| DE | 21 2010 000 081 U1 | 3/2012 |
| DE | 10 2012 002 078 A1 | 8/2013 |
| JP | 7-123514 A | 5/1995 |
| JP | 2010-28881 A | 2/2010 |
| WO | WO 2013/061370 A1 | 4/2015 |

OTHER PUBLICATIONS

International Search Report (PCT/ISA/210) issued in PCT Application No. PCT/EP2014/069048 dated Feb. 25, 2015 with English translation (five pages).

German-language Written Opinion (PCT/ISA/237) issued in PCT Application No. PCT/EP2014/069048 dated Feb. 25, 2015 (five pages).

German Search Report issued in counterpart German Patent Application No. 10 2013 219 967.8 dated Jul. 28, 2014 with partial English translation (12 pages).

Chinese-language Office Action issued in counterpart Chinese Application No. 201480053370.X dated Feb. 3, 2017 with English translation (21 pages).

* cited by examiner

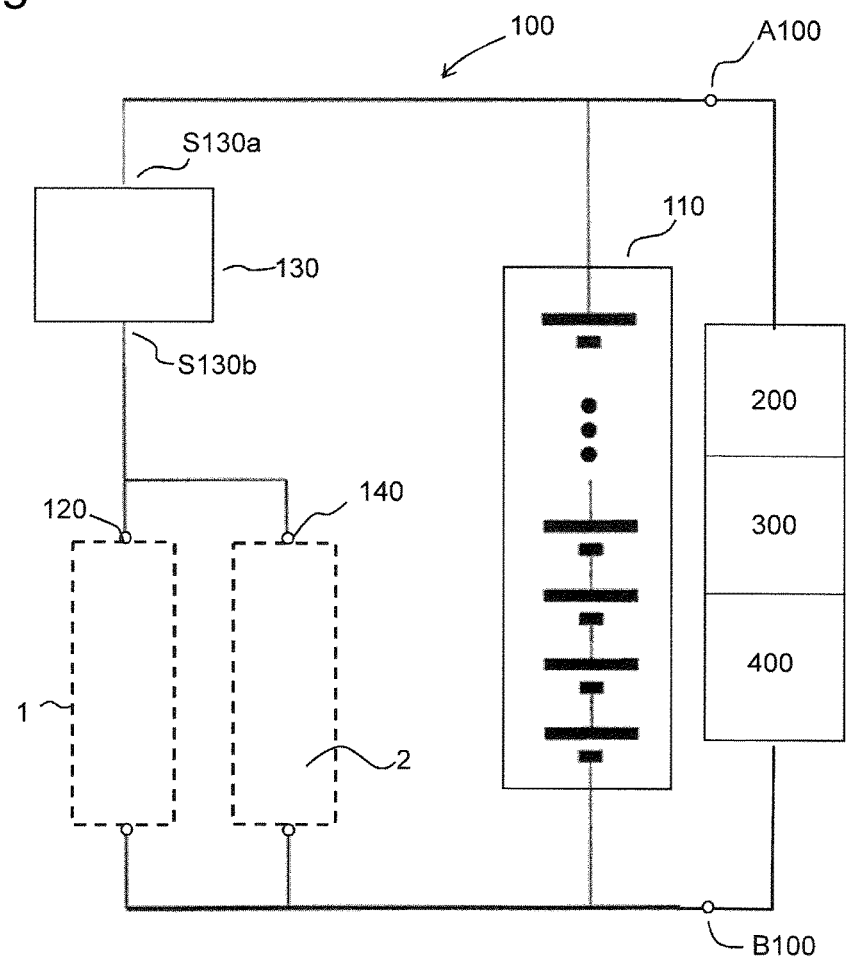

DEVICE FOR SUPPLYING A VOLTAGE TO AN ELECTRIC VEHICLE COMPRISING A PERMANENT MAIN BATTERY AND A REPLACEABLE AUXILIARY BATTERY

CROSS REFERENCE TO RELATED APPLICATIONS

This application is a continuation of PCT International Application No. PCT/EP2014/069048, filed Sep. 8, 2014, which claims priority under 35 U.S.C. § 119 from German Patent Application No. 10 2013 219 967.8, filed Oct. 1, 2013, the entire disclosures of which are herein expressly incorporated by reference.

BACKGROUND AND SUMMARY OF THE INVENTION

The invention relates to an apparatus for providing a supply voltage for operating an electric device of a vehicle, particularly for operating an electric motor of the vehicle, for driving the vehicle. The invention additionally relates to an electrically driven vehicle having such an apparatus. In addition, the invention relates to a method for providing a supply voltage for operating an electric device for a vehicle, particularly for operating an electric motor of the vehicle, that is used for driving the vehicle.

As a result of increased environmental concerns and the increasing scarcity of raw materials for producing fuels for internal combustion engines, electromobility is becoming increasingly important. At present, however, there is insufficient infrastructure with regard to charging stations for charging batteries of electric vehicles. Charging stations are available to a small extent just for automobiles. These charging stations have charging connectors that are relatively large and, in particular, are not suitable for charging low-voltage batteries of electrically operated motorcycles or scooters, which provide voltage levels of below 60 V, for example.

Charging a battery or a storage battery of an electrically operated automobile or motorcycle usually requires a special charger that needs to be connected to a safety-ground socket in order to charge the battery of the automobile or motorcycle. However, if there are no sockets available, for example in a car park or in an underground parking garage for a tenant-occupied house or multiple dwelling house, charging the battery of an electrically operated vehicle is often difficult for the driver or associated with increased complexity.

The object of the present invention is to provide an apparatus for providing a supply voltage for operating an electric device of a vehicle, wherein the apparatus provides the supply voltage reliably for a long time. A further object of the present invention is to provide an electrically driven vehicle that can be electrically operated for a long time. A further object of the present invention is to provide a method for providing a supply voltage for operating an electric device of a vehicle in which the supply voltage can be provided reliably for a long time.

An embodiment of an apparatus for providing a supply voltage for operating an electric device of a vehicle includes a supply voltage connection for providing the supply voltage for operating the vehicle, a battery for producing the supply voltage for operating the vehicle, wherein the battery is connected to the supply voltage connection, and a contact-connection device for making contact with a replaceable storage battery for providing a charging voltage for charging the battery. The apparatus additionally includes a coupling device for electrically coupling the replaceable storage battery to the battery, wherein the coupling device is arranged between the contact-connection device and the battery. The coupling device is designed to electrically couple or isolate the replaceable storage battery to/from the battery on the basis of a state of charge of the battery when the replaceable storage battery is in contact with the contact-connection device.

An electrically driven vehicle that can be electrically operated for a long time includes the apparatus specified above for providing a supply voltage for operating an electric device of the vehicle. An electric motor of the vehicle for driving the vehicle, a generator of the vehicle and/or a DC-DC voltage converter of the vehicle may be connected to the supply voltage connection.

A method for providing a supply voltage for operating an electric device of a vehicle provides for the provision of an apparatus for providing a supply voltage for operating the electric device of the vehicle having a battery for producing the supply voltage and a replaceable storage battery for producing a charging voltage for charging the battery. The replaceable storage battery is coupled to the battery when the level of the supply voltage provided by the battery is less than or equal to a first threshold value and the level of the charging voltage produced by the replaceable storage battery is above a second threshold value. The charging voltage of the replaceable storage battery is taken as a basis for producing a charging current that flows into the battery. The replaceable storage battery is isolated from the battery when the level of the supply voltage provided by the battery is above the first threshold value.

Batteries that are used for providing a supply voltage for an electric motor of a vehicle are usually large and heavy, since they need to provide a high drive power, for example a current of 300 A. The batteries or storage batteries permanently installed in electric vehicles weigh up to 20 kg, for example. A contact-connection system for a replaceable storage battery that yields the requisite drive power of 300 A, for example, is likewise large and expensive.

The invention therefore proposes providing the battery that needs to provide the high power as a battery that is permanently fitted in the apparatus for providing the supply voltage and using a small, lightweight and inexpensive storage battery for the replaceable storage battery. The cells of the replaceable storage battery for producing the charging voltage for charging the permanently fitted battery may be optimized for a high energy density, while the permanently fitted battery for producing the supply voltage, for example for operating the electric motor of the vehicle, has battery cells that are optimized for power.

Whereas the permanently fitted battery needs to be designed for the life of the vehicle, the replaceable storage battery can be designed for a shorter life. Fast regeneration of the cell chemistry in the replaceable storage battery is simple to implement and can increase the added value for a used vehicle. When the battery for providing the supply voltage becomes old and loses energy, it is possible to compensate for the energy loss at least in part with a new replacement storage battery having a higher energy density.

The contact-connection device may be designed such that the replaceable storage battery can easily be removed from the apparatus for providing the supply voltage and replaced by another replaceable storage battery. Exchanging the replaceable storage battery does not require specialist personnel from a workshop. A driver can replace the replaceable storage battery himself in uncomplicated fashion. The use of a replaceable storage battery in the apparatus for providing the supply voltage is possible particularly on account of the decoupling between the battery for producing the supply voltage and the replaceable storage battery. For example, it is possible to use motorcycle storage batteries for the replaceable storage battery, these being produced in large numbers and at a reasonable price.

According to one embodiment of the apparatus for providing the supply voltage, besides the charging of the permanently fixed battery by the replaceable battery, there is provision for energy produced during driving to be used to recharge the permanently fitted battery and/or the rechargeable storage battery following a discharge. When the vehicle travels downhill, for example, the energy recovered in the process can be used by the apparatus for providing the supply voltage in order to charge the permanently fitted battery and/or the replaceable storage battery.

The topology of the apparatus for providing the supply voltage can provide for it to be possible to use a plurality of replaceable storage batteries, which are arranged in different contact-connection devices, for the purpose of charging the permanently installed battery. Appropriate switching elements, which may be fitted in the replaceable storage battery packs, and the coupling device can be used to couple the replaceable storage batteries to the permanently fitted main battery selectively on an alternate basis for the purpose of charging the latter.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a diagram of an embodiment of an apparatus for providing a supply voltage for operating a vehicle;

DETAILED DESCRIPTION OF THE DRAWINGS

Figure 1A:
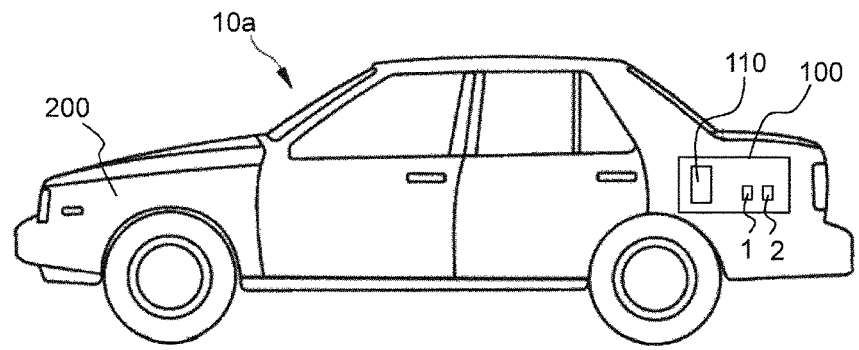
FIG. 1A is a schematic diagram of an embodiment of an electrically driven automobile with a battery and a replaceable storage battery.
Figure 1B:
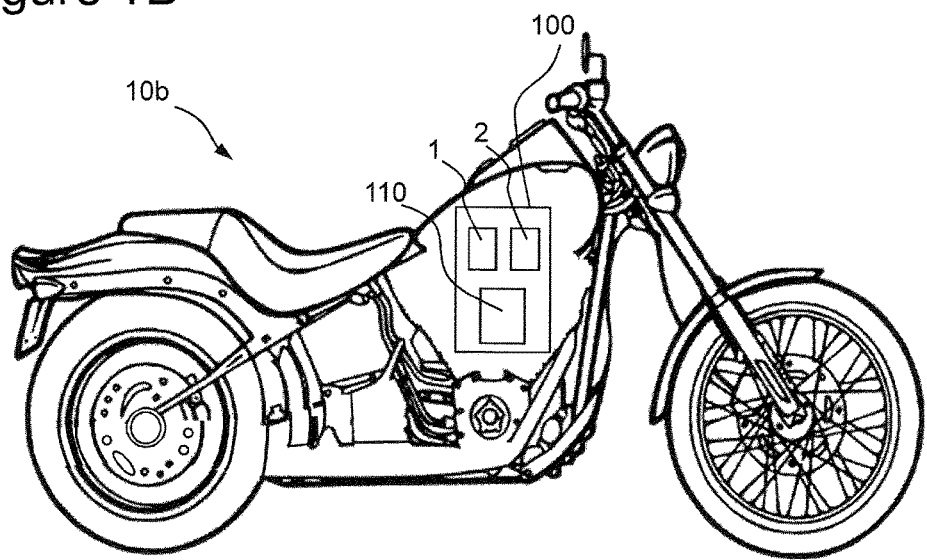
FIG. 1B is a schematic diagram of an embodiment of an electrically driven motorcycle with a battery and a replaceable storage battery.

For the purpose of operating electric devices of a vehicle, the vehicle can have an apparatus for providing a supply voltage. By way of example, an electric device may be an electrical circuit or an electric motor for driving the vehicle. FIG. 1A shows an automobile 10a by way of example and FIG. 1B shows a motorcycle 10b with a respective apparatus 100 for providing a supply voltage for operating an electric device of the automobile or motorcycle. In the case of an electrically driven vehicle, the electric device may be an electric motor.

The apparatus 100 for providing the supply voltage for operating an electric device 200 has not only a main battery 110 for producing the supply voltage but also at least one replaceable storage battery 1, 2. Whereas the battery 110 for producing the supply voltage is provided as a main storage battery that is permanently fitted in the apparatus 100 and hence in the vehicle 10a, 10b, for example, the replaceable storage batteries 1, 2 may be in much smaller and lighter form.

According to the invention, the main battery 110 provides the power for operating the electric device of the vehicle, while the replaceable storage batteries 1, 2 are provided for charging and recharging the main battery 110. The battery 110 may be designed for providing a high electric power, for example providing a voltage of between 48 V and 400 V, while the replaceable storage batteries 1, 2 are optimized for storing a high energy density.

FIG. 2 shows a topology for a possible embodiment of the apparatus 100 for providing the supply voltage for operating an electric device of the vehicle, for example for operating an electric motor of an automobile or motorcycle for driving the automobile or motorcycle. The apparatus 100 includes a supply voltage connection A100 for providing the supply voltage for operating the electric device of the vehicle and a reference-ground voltage connection B100. The apparatus 100 additionally has a battery 110 for producing the supply voltage for operating the electric device of the vehicle. The battery 110 is connected to the supply voltage connection A100.

Furthermore, the apparatus 100 has at least one contact-connection device 120, 140 for making contact with at least one replaceable storage battery 1, 2 for respectively providing a charging voltage for charging the battery 110. In addition, the apparatus 100 includes a coupling device 130 for electrically coupling the at least one replaceable storage battery 1, 2 to the battery 110. The coupling device 130 is arranged between the at least one contact-connection device 120, 140 and the battery 110. The coupling device 130 is particularly designed to electrically couple or isolate the at least one replaceable storage battery 1, 2 to/from the battery 110 on the basis of a state of charge of the permanently fitted battery 110 when the at least one replaceable storage battery 1, 2 is in contact with the at least one contact-connection device 120, 140.

The apparatus 100 for providing the supply voltage allows the battery 110 to be recharged during the journey by a charging current that is drawn from the replaceable storage batteries 1, 2, while the battery 110 simultaneously delivers the supply voltage for operating the electric device of the vehicle, for example the electric motor 200.

The battery 110 may be arranged in the apparatus 100 as a permanently fitted battery whose cells are designed to be optimized for power. By way of example, the battery 110 may be a low-voltage or a high-voltage battery, for example a battery for providing a voltage of between 48 V and 400 V.

The coupling device 130 has a first side S130a and a second side S130b. The first side S130a of the coupling device may be connected to the battery 110 and to the supply voltage connection A100. The second side S130b of the coupling device 130 may be connected to the at least one contact-connection device 120, 140. The coupling device 130 can contain a DC-DC voltage converter (DC/DC converter) so that the replaceable storage batteries 1, 2 can be coupled to the main battery 110, particularly when the replaceable storage batteries 1, 2 and the main battery 110 have a different voltage level.

The at least one replaceable storage battery 1, 2 preferably provides, on the respective contact-connection device 120, 140, a voltage of below 60 V for charging the battery 110. When the battery 110 is in the form of a high-voltage storage battery that produces a much higher voltage, for example a voltage of between 48 V and 400 V, DC isolation becomes necessary on the coupling device 130, this being brought about by the DC-DC voltage converter that the coupling device contains. When the battery 110 provides a supply voltage on the supply voltage connection A100 that is likewise below the voltage produced by the at least one replaceable storage battery 1, 2, for example likewise below 60 V, it is possible to dispense with the DC isolation by the coupling device 130 for cost-saving reasons, since a voltage of below 60 V is generally rated as nonhazardous.

The coupling device 130 may be in unidirectional form if the at least one replaceable storage battery 1, 2 is provided merely for producing a charging voltage for charging the battery 110. According to one possible embodiment, the apparatus 100 may be designed to recharge the at least one replaceable storage battery 1, 2 by means of energy recovery (recuperation) following a discharge. In this embodiment of the apparatus 100, the coupling device 130, particularly the DC-DC voltage converter of the coupling device, may be in bidirectional form in order to be able to store the recuperated energy in the replaceable storage batteries 1, 2.

Figure 3:
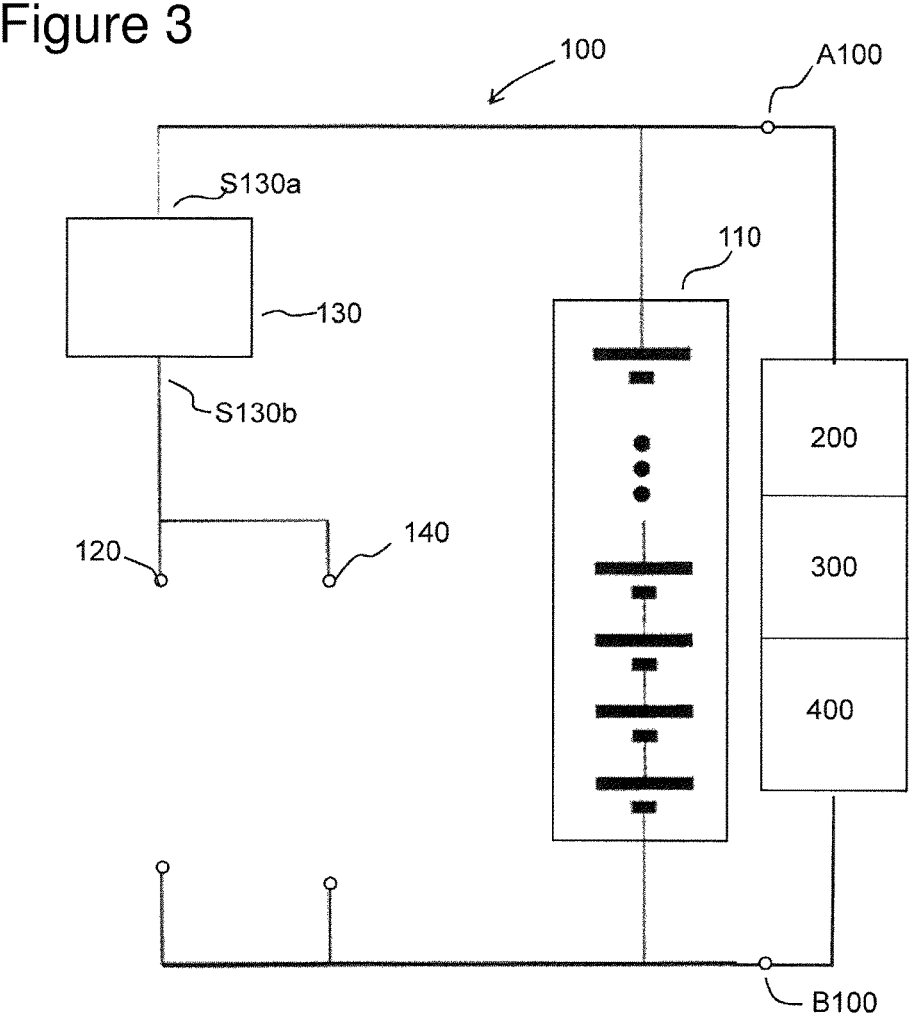
FIG. 3 is a diagram of an embodiment of an apparatus for providing a supply voltage for operating a vehicle without replaceable storage batteries.

FIG. 3 shows the apparatus 100 in FIG. 2 for providing a supply voltage for operating an electric device, for example an electric motor 200, of the vehicle on the supply voltage connection A100, wherein no replaceable storage batteries 1 and 2 are connected to the contact-connection device 120 or the contact-connection device 140. The apparatus 100 therefore merely comprises the permanently fitted battery 110, the coupling device 130 and the contact-connection devices 120, 140 for making contact with the replaceable storage batteries.

When the battery 110 is charged, the battery 110 can provide sufficient power in order to deliver the requisite power, for example a current of 200 A, or to allow a requisite operating period for the electric motor 200. Charging of the battery 110 is possible not just via the replaceable storage batteries 1, 2. To charge the battery 110, a charger 300, for example an onboard charger of the vehicle 10, may be connected to the supply voltage connection A100. The battery 110 is then charged not via one of the replaceable storage batteries but rather via the charger 300. Charging the battery 110 requires the charger 300 to be connected to a socket for providing a necessary charging voltage.

Figure 4:
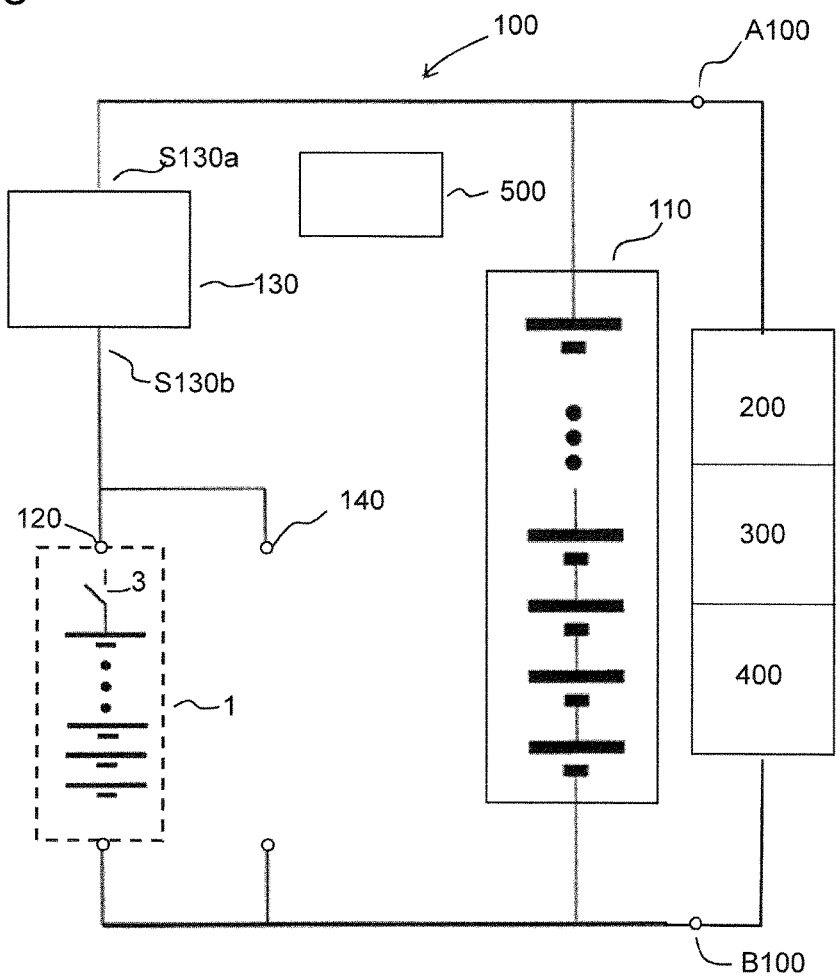
FIG. 4 is a diagram of an embodiment of an apparatus for providing a supply voltage for operating a vehicle with a replaceable storage battery for charging a vehicle battery and for recharging the battery and/or the replaceable storage battery.

FIG. 4 shows the apparatus 100 in FIG. 2 for providing the supply voltage for operating an electric device, for example an electric motor 200, of a vehicle, in which only one replaceable storage battery 1 is coupled to the contact-connection device 120, whereas no replaceable storage batteries are connected to the contact-connection device 140.

A controller 500 is provided in order to monitor the supply voltage provided by the battery 110 and also the charging voltage provided by the replaceable storage battery 1 for charging the battery 110 and to control the coupling device 130. When the controller 500 establishes that the battery 110 is sufficiently charged, so that the supply voltage for operating the electric device, particularly the electric motor 200, of the vehicle can be provided by the battery 110, the controller 500 controls the coupling device 130 such that the replaceable storage battery 1 is decoupled or isolated from the battery 110. When the controller 500 establishes that the level of the supply voltage provided by the battery 110 is equal to a first threshold value or drops below the first threshold value, on the other hand, the coupling device 130 is actuated by the controller 500 such that the replaceable storage battery 1 for charging the main battery is electrically coupled to the main battery 110 via the coupling device 130.

The coupling device 130 may be designed to electrically couple the replaceable storage battery 1 to the battery 110 and, on the first side S130a of the coupling device 130, to produce a charging current for charging the battery 110 when the replaceable storage battery 1 is in contact with the contact-connection device 120 and the level of the supply voltage provided by the battery 110 on the supply voltage connection A100 is less than or equal to the first threshold value and the level of the charging voltage produced by the replaceable storage battery 1 on the contact-connection device 120 is above a second threshold value. When the controller 500 therefore establishes that the permanently fitted battery 110 is no longer fully charged, for example, energy can be taken from the replaceable storage battery 1 and the battery 110 can be recharged.

The coupling device 130 may additionally be designed to electrically isolate the replaceable storage battery 1 from the battery 110 when the replaceable storage battery 1 is in contact with the contact-connection device 120 and the level of the supply voltage provided by the battery 110 on the supply voltage connection A100 is above the first threshold value. When the controller 500 establishes that the charging of the battery 110 by the replaceable storage battery 1 means that the battery 110 is sufficiently charged again, for example, the controller 500 actuates the coupling device 130 such that the replaceable storage battery 1 is isolated from the battery 110.

For the purpose of connecting and isolating the replaceable storage battery 1 to/from the permanently fitted battery 110, the replaceable storage battery 1 can have a controllable switching element 3, for example, the switching state of which can be controlled by the coupling device 130 or directly by the controller 500. If the apparatus 100 has just one replaceable storage battery 1, it is possible to dispense with the switching element 3, since the coupling device 130 and particularly the DC-DC voltage converter that it contains can electrically isolate the replaceable storage battery 1 from the permanently fitted battery 110 internally too.

According to a further possible embodiment, the supply voltage connection A100 may be designed for the application of a further charging voltage that is used for charging the replaceable storage battery 1. The first side S130a of the coupling device 130 is connected to the supply voltage connection A100. The coupling device 130 is designed to connect the replaceable storage battery 1 to the supply voltage connection A100 on the basis of the state of charge of the replaceable storage battery or on the basis of the level of the charging voltage produced by the replaceable storage battery on the contact-connection device 120 when the replaceable storage battery 1 is in contact with the contact-connection device 120 and the further charging voltage for charging the replaceable storage battery 1 is applied to the supply voltage connection A100.

According to this embodiment of the apparatus 100, the replaceable storage battery 1 can be charged in a recuperation mode of the apparatus 100 by applying the further charging voltage to the supply voltage connection A100 by recovering energy from the kinematic vehicle energy of the vehicle 10a, 10b. During the recuperation mode, the motor 200 acts as a generator and produces the further charging voltage for charging the replaceable storage battery 1 on the supply voltage connection A100.

When the controller 500 establishes that the voltage level of the replaceable storage battery 1 on the contact-connection device 120 is equal to the second threshold value or has fallen below the second threshold value, the replaceable storage battery 1 is connected to the supply voltage connection A100 via the coupling device 130 and can be recharged again. In this embodiment, the coupling device 130 is designed to produce, on the second side S130b of the coupling device 130, a charging current for charging the replaceable storage battery 1 when the replaceable storage battery 1 is in contact with the contact-connection device 120 and the level of the charging voltage produced by the replaceable storage battery 1 on the contact-connection device 120 is less than or equal to the second threshold value. Following charging of the replaceable storage battery 1, the latter can again provide energy for recharging the permanently fitted vehicle battery 110.

During the recuperation mode, the kinematic vehicle energy can also be used to charge the battery 110. If the battery 110 and the replaceable storage battery 1 have a low state of charge, it is possible, for example during the recuperation mode, to recharge first the battery 110 and then the replaceable storage battery 1.

Figure 5:
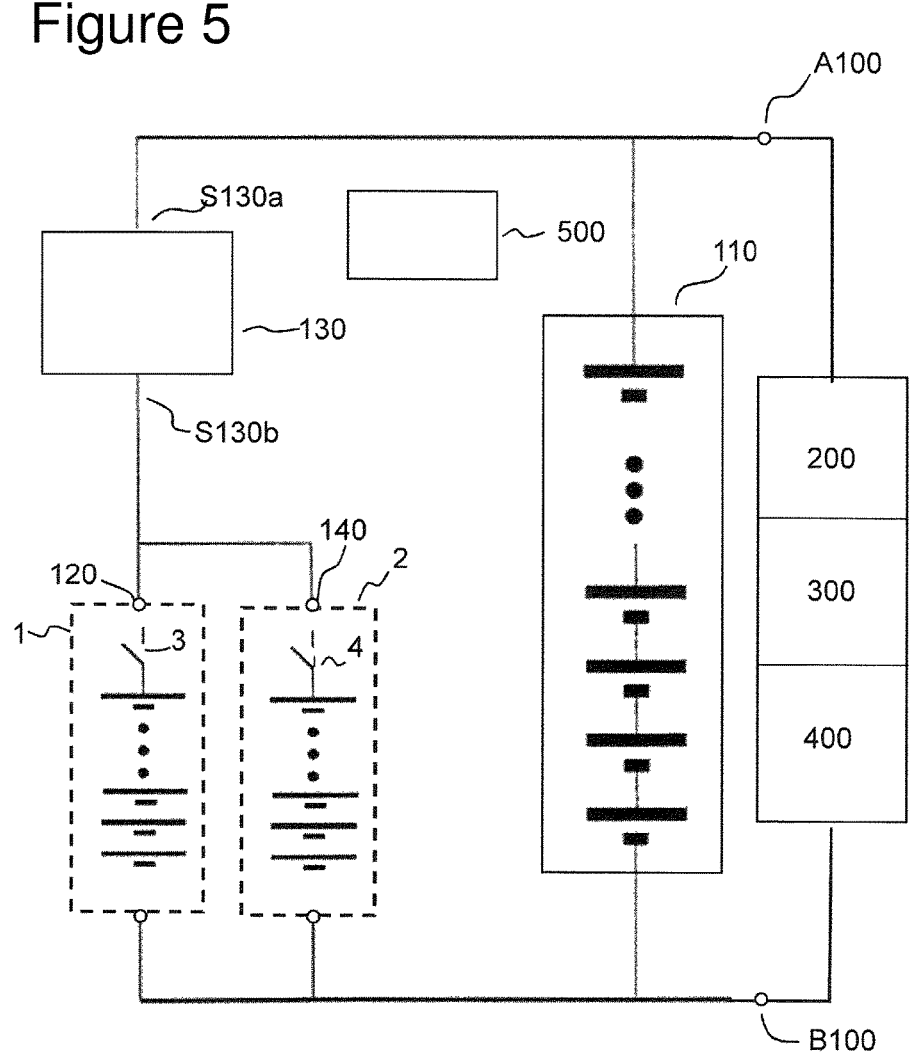
FIG. 5 is a diagram of an embodiment of an apparatus for providing a supply voltage for operating a vehicle with a plurality of replaceable storage batteries for charging a vehicle battery and for recharging the battery and/or the replaceable storage battery.

FIG. 5 shows the apparatus 100 in FIG. 2 for providing a supply voltage for operating an electric device, particularly for operating the electric motor 200, of a vehicle. In contrast to the embodiment shown in FIG. 4, the embodiment of the apparatus 100 that is shown in FIG. 5 has not only the replaceable storage battery 1 but also a further replaceable storage battery 2 connected to the contact-connection device 140. FIG. 5 therefore shows the case when a plurality of replaceable storage batteries 1, 2 are present in the apparatus 100.

In this embodiment, the coupling device 130 may be designed such that it takes a state of charge of the replaceable storage battery 1 and of the further replaceable storage battery 2 as a basis for selectively connecting either the replaceable storage battery 1 or the further replaceable storage battery 2 to the second side S130b of the coupling device 130 and, on the first side S130a of the coupling device 130, producing the charging current for charging the battery 110 when the replaceable storage battery 1 is in contact with the contact-connection device 120 and the further replaceable storage battery 2 is in contact with the further contact-connection device 140 and the state of charge of the battery 110 or the level of the supply voltage that is provided by the battery 110 is less than or equal to the first threshold value.

By way of example, the apparatus 100 has the controller 500, which is designed to establish the state of charge of the permanently fitted main battery 110 and also the respective state of charge of the replaceable storage batteries 1, 2. When the controller 500 establishes that the battery 110 is fully charged, the coupling device 130 is actuated by the controller 500 such that the coupling device 130 electrically isolates the replaceable storage batteries 1, 2 from the battery 110. In the embodiment shown in FIG. 5, the replaceable storage batteries 1, 2 each have a controllable switching element 3, 4, for example, which can be switched to the on or off state by the coupling device 130 or directly by the controller 500. To isolate the replaceable storage batteries 1, 2 from the main storage battery 110, the switching elements 3, 4 can be turned off by the coupling device 130 or directly by the controller 500.

When the controller 500 establishes that the battery 110 is not fully charged, the controller 500 actuates the coupling device 130 such that the coupling device 130 selectively connects one of the replaceable storage batteries 1, 2 to the battery 110. By way of example, the coupling device 130 first of all turns on the controllable switch 3 of the replaceable storage battery 1 and puts the controllable switch 4 of the replaceable storage battery 2 into the off state. As a result, the replaceable storage battery 1 is connected to the main battery 110. On the first side S130a of the coupling device, a charging current for charging the battery 110 can be produced on the basis of the state of charge of the replaceable storage battery 1.

When the replaceable storage battery 1 has discharged as a result of the charging process, the coupling device 130 or the controller 500 can switch the controllable switch 3 of the replaceable storage battery 1 to the off state and the controllable switch 4 of the replaceable storage battery 2 to the on state. Hence, the replaceable storage battery 1 is isolated from the battery 110 and instead the replaceable storage battery 2 is connected to the battery 110. On the first side S130a of the coupling device 130, a charging current is produced on the basis of the state of charge of the replaceable storage battery 2 and is supplied to the permanently fitted battery 110 for charging. When the main battery 110 is fully charged, the coupling device 130 or the controller 500 isolates the replaceable storage battery 2 from the main battery 110 again.

According to one possible embodiment of the apparatus 100, the coupling device 130 has a bidirectional DC-DC voltage converter that allows a charging current for charging the battery 110 to be provided on the first side S130a of the coupling device 130 and a charging current for charging the replaceable storage batteries 1, 2 to be provided on the second side S130b of the coupling device 130.

In this embodiment of the apparatus 100, as in the embodiment in FIG. 4, kinematic vehicle energy can be converted into a charging voltage for charging the battery 110 or the replaceable storage batteries 1, 2. The charging voltage is provided by virtue of recuperation on the supply voltage connection A100 by the motor 200, which acts as a generator during the recuperation mode, during travel, for example during downhill travel. The coupling device 130 can be used to selectively connect one of the replaceable storage batteries 1, 2 to the supply voltage connection A100 for recharging.

To this end, the coupling device 130 may be in a form such that it takes a state of charge of the replaceable storage battery 1 and of the further replaceable storage battery 2 as a basis for connecting either the replaceable storage battery 1 or the further replaceable storage battery 2 to the second side S130b of the coupling device 130 and, on the second side S130b of the coupling device, producing the charging current for charging the replaceable storage battery 1 or the further replaceable storage battery 2. This is done when the replaceable storage battery 1 is in contact with the contact-connection device 120 and the further replaceable storage battery 2 is in contact with the further contact-connection device 140 and at least one of the level of the charging voltage produced by the replaceable storage battery 1 on the contact-connection device 120 and the level of the charging voltage produced by the further replaceable storage battery 2 on the further contact-connection device 140 is less than or equal to the second threshold value.

When the battery 110 has a low state of charge, it is possible for the battery 110 to be recharged first, for example, in the recuperation mode of the apparatus 100.

When the controller 500 establishes that the permanently fitted battery 110 is fully charged, for example, the replaceable storage batteries 1, 2 can be connected to the supply voltage connection A100 via the coupling device 130 in order to store energy recovered from the drive 200 in the replaceable storage batteries. When the controller 500 establishes that the replaceable storage battery 1 is no longer fully charged, for example, the coupling device 130 can be actuated by the controller 500 such that the controllable switch 3 of the replaceable storage battery 1 can be switched to the on state by the coupling device 130 and the controllable switch 4 of the replaceable storage battery 2 can be switched to the off state. As a result, the replaceable storage battery 1 is connected to the supply voltage connection A100 on which the charging voltage for charging the replaceable storage battery 1 is provided, and the replaceable storage battery 1 can be fully recharged.

When the controller 500 establishes that the replaceable storage battery 1 is fully charged again, the coupling device 130 can be actuated by the controller 500 such that the coupling device 130 switches the controllable switch 3 of the replaceable storage battery 1 to the off state and the controllable switch 4 of the replaceable storage battery 2 to the on state. As a result, the replaceable storage battery 1 is isolated from the supply voltage connection A100 and the replaceable storage battery 2 is connected to the supply voltage connection A100 instead.

The charging voltage provided on the supply voltage connection A100 can now charge the replaceable storage battery 2. When the controller 500 establishes that the replaceable storage battery 2 is also fully charged again, the controller 500 can actuate the coupling device 130 such that the controllable switch 4 is switched to the off state by the coupling device 130, so that both replaceable storage batteries are isolated from the supply voltage connection A100.

In another embodiment of the apparatus 100, the controllable switches 3 and 4 of the replaceable storage batteries 1, 2 can also be switched to the on or off state by the controller 500 directly.

The supply voltage provided by the apparatus 100 on the supply voltage connection A100 can be used to operate any electric devices of a vehicle that contains the apparatus 100. By way of example, these electric devices may be the aforementioned electric motor 200 or else any other electrical loads that require a lower voltage than the voltage produced by the battery 110, for example. For the purpose of operating such electrical loads, the supply voltage connection A100 may have a DC-DC voltage converter 400 connected to it, for example, that is used in order to supply the voltage to a lower voltage level, for example to a voltage level of 12 V, and to supply it to the vehicle onboard power supply system.

LIST OF REFERENCE SYMBOLS 1, 2 replaceable storage batteries
10a, 10b vehicle
100 apparatus for providing a supply voltage
110 battery
120 contact-connection device
130 coupling device
140 contact-connection device
200 electric motor
300 charger
400 DC-DC voltage converter
500 controller The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for providing a supply voltage for operating an electric device of a vehicle, comprising:
a supply voltage connection for providing the supply voltage for operating the electric device of the vehicle;
a battery for producing the supply voltage for operating the electric device of the vehicle, wherein the battery is connected to the supply voltage connection;
a contact-connection device for making contact with at least two selectively replaceable storage batteries for providing a charging voltage for charging the battery;
a coupling device for electrically coupling the at least two replaceable storage batteries to the battery, wherein the coupling device is arranged between the contact-connection device and the battery,
wherein
the coupling device is configured to electrically couple or isolate each of the at least two replaceable storage batteries to/from the battery based on a state of charge of the battery when one or more of the at least two replaceable storage batteries is in contact with the contact-connection device,
the first side of the coupling device is connected to the battery and the second side of the coupling device is connected to the contact-connection device,
the coupling device is configured to electrically couple each of the at least two replaceable storage batteries to the battery and, on the first side of the coupling device, to produce a charging current for charging the battery when at least one of the at least two replaceable storage batteries is in contact with the contact-connection device and a level of the supply voltage provided by the battery is less than or equal to a first threshold value and a level of the charging voltage produced by the at least two replaceable storage batteries on the contact-connection device is above a second threshold value,
the coupling device is configured such that it takes a state of charge of the each of the at least two replaceable storage batteries currently coupled to the coupling device as a basis for connecting one or more of the at least two replaceable storage batteries to the second side of the coupling device and, on the first side of the coupling device, producing the charging current for charging the battery when one or more of the at least two replaceable storage batteries is in contact with the contact-connection device and the level of the supply voltage that is provided by the battery is less than or equal to the first threshold value, and
each of at least two replaceable storage batteries includes a switching device controllable by the coupling device, the controller, or both, to isolate at least one of the at least two replaceable storage batteries from the battery without isolating all of the at least two replaceable storage batteries from the battery.

2. The apparatus according to claim 1, wherein
the coupling device is designed to electrically isolate the at least two replaceable storage batteries from the battery when the at least two replaceable storage batteries is in contact with the contact-connection device and a level of the supply voltage provided by the battery is above the first threshold value.

3. The apparatus according to claim 2, wherein the coupling device is designed to electrically isolate the at least two replaceable storage batteries from the battery when the at least two replaceable storage batteries are in contact with the contact-connection device and a level of the supply voltage provided by the battery is above the first threshold value.

4. The apparatus according to claim 1, wherein:
the supply voltage connection is designed for applying a further charging voltage for charging the at least two replaceable storage batteries,
the first side of the coupling device is connected to the supply voltage connection, and
the coupling device is designed to connect the at least two replaceable storage batteries to the supply voltage connection based on a level of the charging voltage produced by the at least two replaceable storage batteries on the contact-connection device when the at least two replaceable storage batteries are in contact with the contact-connection device and the further charging voltage is applied to the supply voltage connection.

5. The apparatus according to claim 4, wherein the coupling device is designed to produce, on the second side of the coupling device, a charging current for charging at least two replaceable storage batteries when the at least two replaceable storage batteries are in contact with the contact-connection device and a level of the charging voltage produced by the at least two replaceable storage batteries on the contact-connection device is less than or equal to the second threshold value.

6. The apparatus according to claim 1, wherein the coupling device is designed such that it takes a state of charge of the at least two replaceable storage batteries as a basis for connecting at least one of the at least two replaceable storage batteries to the second side of the coupling device and, on the second side of the coupling device, producing the charging current for charging the at least two replaceable storage batteries when the at least two replaceable storage batteries are in contact with the contact-connection device and the level of the charging voltage produced by the at least one of the at least two replaceable storage batteries on the contact-connection device is less than or equal to the second threshold value.

7. The apparatus according to claim 1, wherein the coupling device comprises a DC-DC voltage converter.

8. The apparatus according to claim 6, wherein the coupling device comprises a DC-DC voltage converter.

9. The apparatus according to claim 1, wherein the supply voltage provided by the apparatus designed for operating an electric motor of the vehicle that is suitable for driving the vehicle.

10. An electrically driven vehicle, comprising:
a supply voltage apparatus for operating the vehicle, the apparatus comprising:
a supply voltage connection for providing the supply voltage for operating the electric device of the vehicle;
a battery for producing the supply voltage for operating the electric device of the vehicle, wherein the battery is connected to the supply voltage connection;
a contact-connection device for making contact with at least two replaceable storage batteries for providing a charging voltage for charging the battery;
a coupling device for electrically coupling the at least two replaceable storage batteries to the battery, wherein the coupling device is arranged between the contact-connection device and the battery,
wherein the coupling device is designed to electrically couple or isolate the at least two replaceable storage batteries to/from the battery based on a state of charge of the battery when the at least two replaceable storage batteries are in contact with the contact-connection device,
wherein an electric motor of the vehicle for driving the vehicle, a generator of the vehicle and/or a DC-DC voltage converter of the vehicle is connected to the supply voltage connection.

11. A method for providing a supply voltage for operating an electric device of a vehicle, the method comprising the acts of:
providing an apparatus for providing the supply voltage for operating the electric device of the vehicle having a battery for producing the supply voltage and at least two replaceable storage batteries for producing a charging voltage for charging the battery;
coupling the at least one of the least two replaceable storage batteries to the battery when a level of the supply voltage provided by the battery is less than or equal to a first threshold value and a level of the charging voltage produced by the at least one of the least two replaceable storage batteries is above a second threshold value;
producing of a charging current that flows into the battery, on the basis of the charging voltage of the at least one of the least two replaceable storage batteries; and
isolating of the at least one of the at least two replaceable storage batteries from the battery when the level of the supply voltage provided by the battery is above the first threshold value.

12. The method according to claim 11, further comprising the acts of:
applying a further charging voltage for charging the at least one of the least two replaceable storage batteries to the supply voltage connection;
coupling the at least one of the at least two replaceable storage batteries to the supply voltage connection when the level of the charging voltage provided by the at least one of the least two replaceable storage batteries on the contact-connection device is less than or equal to the second threshold value;
producing a charging current that flows into the at least one of the least two replaceable storage batteries, for the purpose of charging the at least one of the at least two replaceable storage batteries;
isolating of the at least one of the least two replaceable storage batteries from the supply voltage connection when the level of the charging voltage produced by the at least one of the at least two replaceable storage batteries on the contact-connection device is greater than the second threshold value.

* * * * *